United States Patent
Lee et al.

(10) Patent No.: US 11,379,154 B2
(45) Date of Patent: Jul. 5, 2022

(54) STORAGE DEVICE AND OPERATING METHOD THEREOF

(71) Applicant: SK hynix Inc., Icheon-si (KR)

(72) Inventors: Jun Ho Lee, Icheon-si (KR); Bo Hyun Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 16/950,071

(22) Filed: Nov. 17, 2020

(65) Prior Publication Data

US 2022/0004338 A1 Jan. 6, 2022

(30) Foreign Application Priority Data

Jul. 2, 2020 (KR) .......................... 10-2020-0081570

(51) Int. Cl.
*G06F 3/06* (2006.01)
*G06F 11/30* (2006.01)

(52) U.S. Cl.
CPC .......... *G06F 3/0659* (2013.01); *G06F 3/0613* (2013.01); *G06F 3/0653* (2013.01); *G06F 3/0679* (2013.01); *G06F 11/3058* (2013.01)

(58) Field of Classification Search
CPC .... G06F 3/0659; G06F 3/0613; G06F 3/0653; G06F 3/0679; G06F 11/3058
See application file for complete search history.

(56) References Cited

U.S. PATENT DOCUMENTS

| | | | |
|---|---|---|---|
| 2018/0081594 A1* | 3/2018 | Jung | G06F 13/00 |
| 2019/0138225 A1* | 5/2019 | Lee | G06F 3/0625 |
| 2020/0395061 A1* | 12/2020 | Golov | G06F 3/0673 |
| 2021/0081025 A1* | 3/2021 | Hou | G06F 1/3275 |
| 2021/0247916 A1* | 8/2021 | Jung | G06F 1/3206 |
| 2021/0294509 A1* | 9/2021 | Iwata | G06F 3/0634 |
| 2021/0303432 A1* | 9/2021 | Chang | G06F 13/4068 |
| 2021/0397363 A1* | 12/2021 | Boehm | G06F 3/0653 |

FOREIGN PATENT DOCUMENTS

| | | | |
|---|---|---|---|
| KR | 10-2012-0117015 A | | 1/2011 |
| KR | 10-2017-0042985 A | | 4/2017 |
| KR | 1020170042985 | * | 4/2017 |

* cited by examiner

*Primary Examiner* — Charles Rones
*Assistant Examiner* — Tong B. Vo
(74) *Attorney, Agent, or Firm* — Perkins Coie LLP

(57) ABSTRACT

There are provided a storage device and an operating method thereof. A memory controller includes: an operation mode controller for adjusting a standby entry time by using a host idle interval as an interval between host busy periods and a reference interval, and determining an operation mode, based on the adjusted standby entry time and a subsequent host idle interval; and an operation controller for controlling a memory device according to the operation mode.

20 Claims, 14 Drawing Sheets

LUT1

| Tmref | Tm1 | Tm2 | Tm3 | Tm4 | Tm5 | ... |
|---|---|---|---|---|---|---|
| STDBTref | STDBT1 | STDBT2 | STDBT3 | STDBT4 | STDBT5 | ... |

FIG. 13

LUT2

| ... | Tmref~Tmr1 | Tmr1~Tmr2 | Tmr2~ | ... |
|---|---|---|---|---|
| ... | STDBT1 | STDBT2 | STDBT3 | ... |

FIG. 16

LUT3

|  | Tm1~Tm2 | Tm2~Tm3 | Tm3~Tm4 | Tm4~Tm5 |
|---|---|---|---|---|
| STDBT1 | a1*STDBT1 | a2*STDBT1 | a3*STDBT1 | a4*STDBT1 |
| STDBT2 | b1*STDBT2 | b2*STDBT2 | b3*STDBT2 | b4*STDBT2 |
| STDBT3 | c1*STDBT3 | c2*STDBT3 | c3*STDBT3 | c4*STDBT3 |

STDBT'

STORAGE DEVICE AND OPERATING METHOD THEREOF

CROSS-REFERENCE TO RELATED APPLICATION

This patent document claims priority to and benefits of the Korean patent application number 10-2020-0081570, filed on Jul. 2, 2020, which is incorporated herein by reference in its entirety.

TECHNICAL FIELD

Various implementations of the disclosed technology generally relate to an electronic device, and more particularly, to a storage device and an operating method thereof.

BACKGROUND

Storage devices refer to electronic components that are configured to store data on a permanent or temporary basis. Each storage device may include one or more storage medium to store data and operate based on a request from a host. The storage device may include a storage medium for storing data and may further include a memory controller for controlling the storage medium to store or retrieve data. The storage device can be classified based on the type of storage medium. For example, the memory device used as a storage medium is classified into a volatile memory device and a nonvolatile memory device.

A volatile memory device may store data while being supplied with power from a power supply. Thus, such a volatile memory device loses its data in the absence of power. Examples of the volatile memory device include a Static Random Access Memory (SRAM) or a Dynamic Random Access Memory (DRAM).

A nonvolatile memory device may be a memory device that can retain its data even in the absence of power. Examples of the nonvolatile memory device include a Read Only Memory (ROM), a Programmable ROM (PROM), an Electrically Programmable ROM (EPROM), an Electrically Erasable ROM (EEROM), or a flash memory.

SUMMARY

Embodiments provide a storage device having a reduced power consumption amount and an operating method thereof.

In one aspect, a memory controller for controlling a memory device is provided to comprise: an operation mode controller configured to adjust a standby entry time by using a host idle interval as an interval between host busy periods and a reference interval, and determine an operation mode, based on the adjusted standby entry time and a subsequent host idle interval; and an operation controller configured to control the memory device according to the operation mode, wherein each of the host busy periods is a period until a request of a host is received, and a response to the request is then provided to the host, and wherein the operation mode controller adjusts the standby entry time according to whether a first host idle interval as a host idle interval exceeding the reference interval or a second host idle interval as a host idle interval smaller than or equal to the reference interval is successively repeated.

In accordance with an aspect of the present disclosure, there is provided a memory controller for controlling a memory device. The memory controller may be in communication with a host to receive one or more requests from the host and configured to operate in a standby mode based on a condition related to a standby entry time. The memory controller may comprise an operation mode controller configured to adjust the standby entry time based on previous host idle intervals that occur before a current host idle interval and configured to determine an operation mode based on a comparison between the adjusted standby entry time and the current host idle interval, an operation controller in communication with the operation mode controller to receive information from the operation mode controller on the operation mode and configured to control the memory device according to the operation mode. Each previous host idle interval may define as an interval between host busy periods. Each host busy period may define as an interval between a reception of a corresponding request from the host and a transmission of a response to the corresponding request to the host. The operation mode controller may be further configured to adjust the standby entry time based on a number of first host idle intervals or another number of second host idle intervals. The first host idle intervals successively occurred as a part of the previous host idle intervals and longer than a reference interval. The second host idle intervals successively occurred as another part of the previous host idle intervals and shorter than or equal to the reference interval.

In accordance with another aspect of the present disclosure, there is provided a memory controller for controlling a memory device. The memory controller is in communication with a host to receive one or more requests from the host and configured to enter a standby mode in case that a standby entry time has been expired. The memory controller may comprise a temperature sensor configured to sense an internal temperature of the memory controller, an operation mode controller configured to adjust the standby entry time that, based on the internal temperature, and determine an operation mode based on an adjusted standby entry time and a host idle interval that is defined as an interval between host busy periods, and an operation controller configured to control the memory device according to the operation mode. Each of the host busy periods is a period between when a corresponding request is received from the host and when a response to the corresponding request is provided to the host.

In accordance with still another aspect of the present disclosure, there is provided a method for operating a memory controller for controlling a memory device, the method comprising: adjusting a standby entry time based on a reference interval and previous host idle intervals that occur before a current host idle interval, each previous host idle interval defined as an interval between host busy periods and each host busy period defined as an interval between a reception of a corresponding request from a host and a transmission of a response to the corresponding request to the host, determining an operation mode based on an adjusted standby entry time and the current host idle interval, and controlling the memory device according to the operation mode.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 13 is a diagram exemplarily illustrating a second lookup table including standby entry time according to internal temperature.

FIG. 16 is a diagram exemplarily illustrating a third lookup table including information on a relationship between standby entry time and internal temperature.

DETAILED DESCRIPTION

The specific structural or functional description disclosed herein is merely illustrative for the purpose of describing embodiments according to the concept of the disclosed technology. The embodiments according to the concept of the disclosed technology can be implemented in various forms, and cannot be construed as limited to the embodiments set forth herein.

Figure 1:
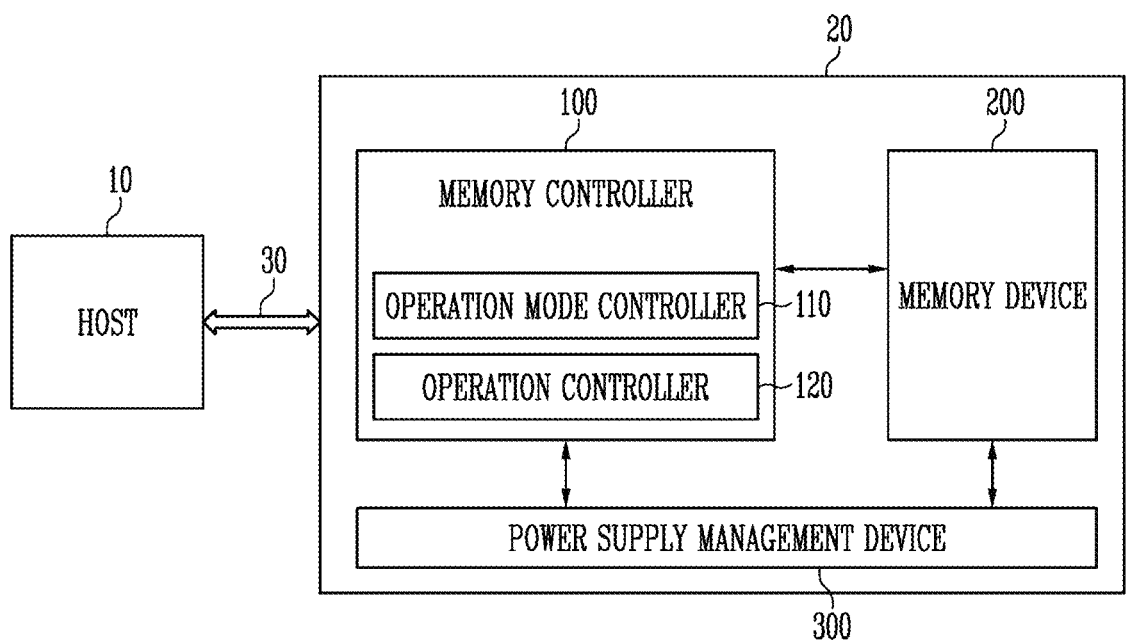
FIG. 1 is a diagram illustrating a storage system in accordance with embodiments of the disclosed technology.

FIG. 1 is a diagram illustrating a storage system in accordance with embodiments of the disclosed technology.

Referring to FIG. 1, the storage system may include a host 10 and a storage device 20. The storage system may be implemented as a personal computer (PC), a data center, an enterprise-type data storage system, a data processing system including a direct attached storage (DAS), a data processing system including a storage area network (SAN), a data processing system including a network attached storage (NAS), etc.

The host 10 may communicate with the storage device 20 through an interface 30.

The interface 30 may be implemented as a serial advanced technology attachment (SATA) interface, a SATA express (SATAe) interface, a serial attached small computer system interface (SAS) interface, a peripheral component interconnect express (PCIe) interface, a non-volatile memory express (NVMe) interface, an advanced host controller interface (AHCI) interface, or a multimedia card interface. However, the disclosed technology is not limited thereto.

The host 10 may communicate with the storage device 20 to store data in the storage device 20 or to acquire or retrieve data stored in the storage device 20. The host 10 sends a request to the storage device 20 and the storage device 20 sends a response corresponding to the request to the host 10. The response from the storage device 20 may include an output from the memory controller 100 included in the storage device 20.

A host busy period may occur between the host 10 and the storage device 20. The host busy period may mean a period until a request from the host 10 is provided to the storage device 20, and a corresponding response to the request is provided to the host 10 from the storage device 20.

In an embodiment, for a writing operation, the host 10 may provide the storage device 20 with a write request, write data, and a logical address for identifying an area of the storage device 20 in which the write data is to be written. The storage device 20 may provide the host 10 with a response indicating that storage of the write data has been completed or a response indicating that the storage of the write data has failed. In this case, the host busy period may be a period between when the write request, the write data, and the logical address are provided to the storage device 20, and when a response indicating that the storage of the write data has been completed or has failed is provided to the host 10.

In an embodiment, for a read operation, the host 10 may provide the storage device 20 with a read request requesting the storage device 20 to read stored data and a logical address identifying an area of the storage device 20 from which the read data is to be read. The storage device 20 may provide the host 10 with a response indicating that read data or a read operation has failed. In this case, the host busy period may be a period between when the read request and the logical address are provided to the storage device 20, and when the response indicating that the read data or the read operation has failed is provided to the host 10.

The storage device 20 may include the memory controller 100, the memory device 200, and a power supply management device 300.

The memory controller 100 may control overall operations of the storage device 20.

When power is applied to the storage device 20, the memory controller 100 may execute firmware. When the memory device 200 is a flash memory device, the firmware may include a host interface layer, a flash translation layer, and a flash interface layer.

The host interface layer may control an operation between the host 10 and the memory controller 100.

The flash translation layer may translate a logical address provided from the host 10 into a physical address. To this end, the memory controller 100 may store map data as a mapping relationship between the logical address and the physical address.

The flash interface layer may control communication between the memory controller 100 and the memory device 200.

The memory controller 100 may control the memory device 200 to perform a program operation, a read operation, and an erase operation according to a write request, a read request, and an erase request of the host 10.

In the program operation, the memory controller 100 may provide the memory device 200 with a program command, a physical address, and data.

In the read operation, the memory controller 100 may provide the memory device 200 with a read command and a physical address.

In the erase operation, the memory controller 100 may provide the memory device 200 with an erase command and a physical address.

The memory controller 100 has operation modes. One of the operation modes that is determined for the memory controller 100 to perform an operation corresponding to a request of the host 10 in the host busy period may be referred to as an active mode. In this specification, the terms "active mode," "wake-up mode," and "normal mode" may be used as the same meaning.

The memory controller 100 may autonomously generate a command, an address, and data, regardless of any request provided from the host 10. The memory controller 100 may transmit, to the memory device 200, the command, the address, and the data, which are autonomously generated.

For example, the memory controller 100 may generate a command, an address, and data, which are used to perform a background operation. Also, the memory controller 100 may provide the memory device 200 with the command, the address, and the data.

The background operation may be at least one of wear leveling, read reclaim, and garbage collection.

The wear leveling may mean an operation of storing a number of times memory blocks are erased, and programming data to a memory block having a lowest number of times the memory block is erased.

The read reclaim may mean an operation of moving data stored in a memory block to another memory block before an uncorrectable error occurs in the data stored in the memory block.

The garbage collection may mean an operation of copying valid data included in a bad block among memory blocks to a free block, and erasing invalid data included in the bad block.

The memory controller 100 may control two or more memory devices 200. The memory controller 100 may control the memory devices 200 according to an interleaving scheme so as to improve operational performance.

The interleaving scheme may be a scheme of controlling operations of the two or more memory devices 200 to overlap with each other.

The host busy period may occurs plural times. A certain interval that occurs between two host busy periods, is referred to as a host idle interval.

The host idle interval may occur twice or more. All host idle intervals may have the same value or different values. Alternatively, some of the host idle intervals may have the same value or different values.

In an embodiment, since a request of the host 10 is not provided to the storage device at the host idle interval, the memory controller 100 does not perform an operation corresponding to the request of the host 10 during a period corresponding to the host idle interval. This will be described later with reference to FIGS. 2 and 3.

In an embodiment, when the host idle interval exceeds a certain amount of time, the memory controller 100 may determine the operation mode as a standby mode, and perform an operation corresponding to the standby mode.

In an embodiment, in the standby mode, the memory controller 100 may turn off a processor or a core circuit, which is included therein. A power consumption amount of the memory controller 100 may be decreased.

In an embodiment, in the standby mode, the memory controller 100 may control the memory device 200.

In an embodiment, in the standby mode, the memory controller 100 may control the power supply management device 300.

The standby mode may be a mode for minimizing a power consumption amount consumed by the storage device 20. In the standby mode, operations performed by at least one of the memory controller 100, the memory device 200, and the power supply management device 300 may be partially limited. In this specification, the term "standby mode," "power-save mode," and "sleep mode" may be used as the same meaning.

In an embodiment, the host idle interval may include an internal idle period. Also, the host idle interval may further include an internal busy period. This will be described later with reference to FIGS. 3 and 4.

In an embodiment, during a period corresponding to the internal idle period, the memory controller 100 may generate a command, an address, and data, which are used to perform a background operation.

In an embodiment, during a period corresponding to the internal idle period, the memory controller 100 does not perform an operation corresponding to a request of the host 10 and a background operation, but may rest. In this specification, the term "rest," "idle," and "waiting" may be used as the same meaning.

The memory controller 100 operating in the standby mode may be woken up by receiving a request of the host 10. The woken-up memory controller 100 may determine the operation mode as the active mode, and perform an operation corresponding to the request of the host 10.

When a change between the standby mode and the active mode occurs excessively frequently, the time required to transit from the standby mode to the active mode increases and therefore, the performance of the memory controller 100 may be deteriorated. In the transitioning from the standby mode to the active mode, the memory controller 100 needs some time for the wake-up. On the contrary, when the active mode is unnecessarily maintained, power may be unnecessarily wasted.

The memory controller 100 may include an operation mode controller 110 and an operation controller 120.

The operation mode controller 110 may compare the host idle interval with a reference interval.

The reference interval may be pre-stored in the storage device 20 through an experiment, a design, etc. before the storage device 20 is released. However, the disclosed technology is not limited thereto. For example, the reference interval may be updated based on a standby entry time adjusted after the storage device 20 is released. The standby entry time may be a time for determining an operation mode of the memory controller 100.

In an embodiment, the operation mode controller 110 may adjust the standby entry time according to whether a first host idle interval and a second host idle interval are successively repeated.

The first host idle interval may mean a host idle interval which exceeds the reference interval. The second host idle interval may mean a host idle interval which is smaller than or equal to the reference interval.

The terms "first" and "second" in the first host idle interval and the second host idle interval, which are described above, are merely terms exemplarily used to distinguish a host idle interval which exceeds the reference interval from a host idle interval which is smaller than or equal to the reference interval, and the disclosed technology is not limited thereto.

The adjusted standby entry time may be, for example, a time which is increased, maintained or decreased from a pre-stored reference value. However, the disclosed technology is not limited thereto.

After the standby entry time is adjusted, the operation mode controller 110 may acquire a subsequent host idle time. Also, the operation mode controller 110 may determine an operation mode, based on the adjusted standby entry time and the subsequent host idle interval.

The operation mode may be, for example, the active mode or the standby mode. The information of the operation mode determined by the operation mode controller 110 may be communicated to the operation controller 120 and the operation mode controller 110 and the operation controller 120 may be linked to allow the operation controller 120 to receive a signal indicating the operation mode determined by the operation mode controller 110.

In an embodiment, when the host idle interval includes the internal idle period, the operation mode controller 110 may determine the operation mode as the standby mode, when the internal idle period included in the subsequent host idle interval exceeds the adjusted standby entry time.

The operation controller 120 may control the memory device 200 according to the operation mode determined by the operation mode controller 110. For example, when the operation mode is determined as the standby mode, the operation controller 120 may perform a background operation for maintaining the performance of the memory device 200.

The operation controller 120 may control the power supply management device 300 according to the operation mode. For example, when the operation mode is determined as the standby mode, the operation controller 120 may control an output of the power supply management device 300 which provides power to the memory controller 100.

The operation mode controller 110 and the operation controller 120 may be implemented with a processor.

The memory device 200 may operate under the control of the memory controller 100. Specifically, the memory device 200 may receive a command and an address, and access a memory cell selected by the address in the memory cell array (not shown). The memory device 200 may perform an operation instructed by the command on the memory cell selected by the address. The command may be a program command, a read command, or an erase command as described above.

For example, the memory device 200 may receive a program command, an address, and data, and program the data in a memory cell selected by the address in the memory cell array.

For example, the memory device 200 may receive a read command and an address, and read data from an area selected by the address in the memory cell array.

For example, the memory device 200 may receive an erase command and an address, and erase data stored in an area selected by the address.

In an embodiment, the memory cell array may include a plurality of memory cells which store data. For example, each memory cell may be configured as one of a single level cell, a multi-level cell, a triple level cell, and a quadruple level cell. Alternatively, each memory cell may be configured as a combination of the single level cell, a multi-level cell, the triple level cell, and the quadruple level cell.

The single level cell may store one data bit. The multi-level cell may store two data bits. The triple level cell may store three data bits. The quadruple level cell may store four data bits.

The memory cell array (not shown) may include a plurality of memory blocks (not shown). Each memory block may be an erase unit for erasing data. Each memory block may include a plurality of memory cells. One memory block may include a plurality of pages (not shown). Each page may be a unit for programming data to the memory device 200 or reading data stored in the memory device 200.

In an embodiment, the memory device 200 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or others.

In this specification, for convenience of description, a case where the memory device 200 is a NAND flash memory is assumed.

The power supply management device 300 may supply power to each of the memory controller 100 and the memory device 200 under the control of the memory controller 100.

In an embodiment, when the operation mode of the memory controller 100 is determined as the standby mode, the power supply management device 300 may decrease an amount of power to be provided to the memory controller 100. A power consumption amount of the memory controller 100 may be decreased.

Figure 2:
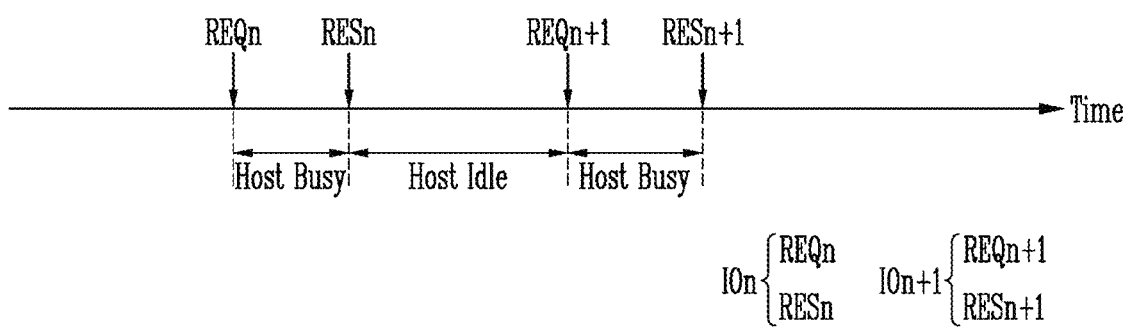
FIG. 2 is a diagram illustrating a host busy period and a host idle interval in accordance with an embodiment of the disclosed technology.

FIG. 2 is a diagram illustrating a host busy period and a host idle interval in accordance with an embodiment of the disclosed technology.

Referring to FIG. 2, the host 10 may provide an nth request (REQn) to the storage device 20, and the memory controller 100 may provide an nth response (RESn) to the nth request (REQn). n is an integer greater than 0.

An nth host busy period (Host Busy) may be a period from when the nth request (REQn) is provided to the memory controller 100 of the storage device 20 to when the nth response (RESn) is provided to the host 10.

In the nth host busy period (Host Busy), the memory controller 100 may determine an operation mode as the active mode.

In the nth host busy period (Host Busy), the memory controller 100 may perform an operation corresponding to the nth request (REQn), and provide the nth response (RESn) to the host 10.

At a certain time, an (n+1)th request (REQn+1) may be provided to the storage device 20. The (n+1)th request (REQn+1) may correspond to a request subsequent to the nth request (REQn). The memory controller 100 may provide the host 10 with an (n+1)th response (RESn+1) to the (n+1)th request (REQn+1).

An (n+1)th host busy period (Host Busy) may be a period from when the (n+1)th request (REQn+1) is provided to the memory controller 100 of the storage device 20 to when the (n+1)th response (RESn+1) is provided to the host 10.

In the (n+1)th host busy period (Host Busy), the memory controller 100 may determine the operation mode as the active mode.

In the (n+1)th host busy period (Host Busy), the memory controller 100 may perform an operation corresponding to the (n+1)th request (REQn+1), and provide the (n+1)th response (RESn+1) to the host 10.

A host idle interval (Host Idle) may be, for example, an interval between the nth host busy period (Host Busy) and the (n+1)th host busy period (Host Busy).

During a period corresponding to the host idle interval (Host Idle), the host 10 doesn't send any request to the memory controller 100, and hence there is no operation performed in the memory controller 100 and the memory controller 100 rests (or idles).

The host 10 may send requests (REQn) and (REQn+1) to the memory controller 100 regularly or irregularly.

An nth input/output signal (IOn) may include the nth request (REQn) provided from the host 10 and the nth response (RESn) provided from the memory controller 100. An (n+1)th input/output signal (IOn+1) may include the (n+1)th request (REQn+1) provided from the host 10 and the (n+1)th response (RESn+1) provided from the memory controller 100.

Figure 3:
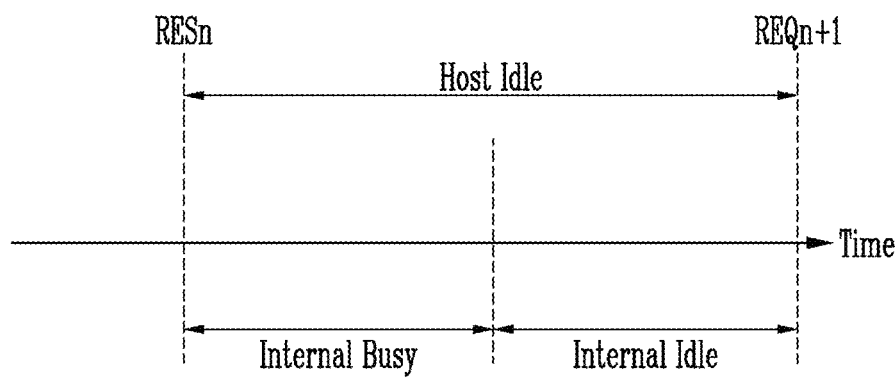
FIG. 3 is a diagram illustrating an internal busy period and an internal idle period, which are included in the host idle interval shown in FIG. 2.

FIG. 3 is a diagram illustrating a host idle interval shown in FIG. 2, which includes an internal busy period and an internal idle period.

Referring to FIG. 3, the host idle interval (Host Idle) may include an internal busy period (Internal Busy) and an internal idle period (Internal Idle).

During the internal busy period (Internal Busy), the memory controller 100 performs a background operation. For example, during the internal busy period (Internal Busy), the operation controller 120 may generate an address and data that are used to perform garbage collection, and provide the memory device 200 with a command, the address, and the data.

The background operation may be performed if necessary. In some implementations, the internal busy period (Internal Busy) may not occur and thus the host idle interval (Host Idle) includes only the internal idle period (Internal Idle) without the internal busy period (Internal Busy).

During the internal idle period (Internal Idle), the memory controller 100 does not perform any operations including the background operation.

Figure 4:
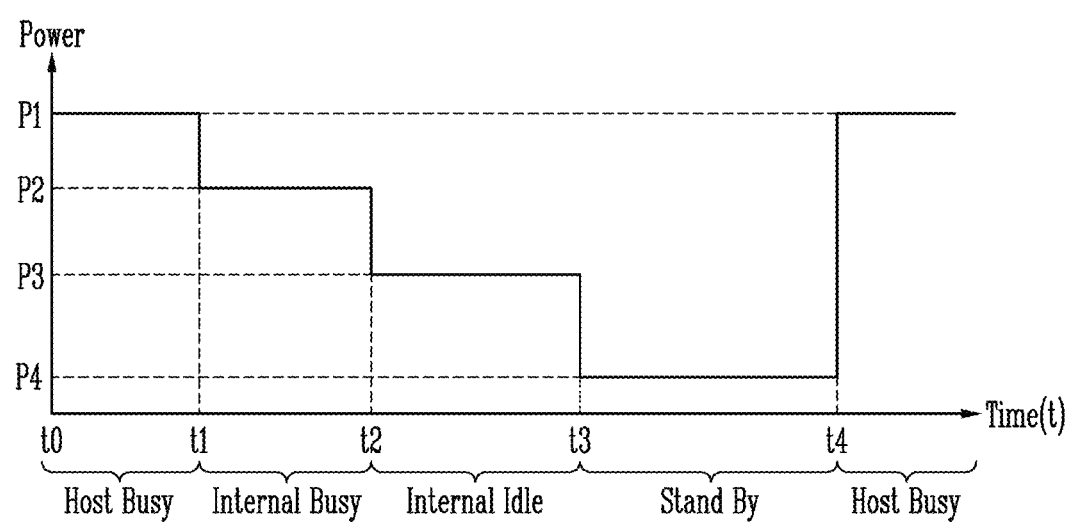
FIG. 4 is a diagram illustrating an embodiment in which a memory controller shown in FIG. 1 enters into a standby mode.

FIG. 4 is a diagram illustrating an embodiment in which the memory controller shown in FIG. 1 enters into the standby mode.

Referring to FIG. 4, during a period corresponding to the host busy period (Host Busy), the memory controller 100 determines an operation mode as the active mode. During the active mode, the memory controller 100 performs an operation corresponding to a request (e.g., the nth request (REQn) shown in FIG. 2) provided from the host 10. During the host busy period (Host Busy), circuits included in the memory controller 100 are turned on and maintain a turn-on state. Therefore, during the host busy period (Host Busy), the memory controller 100 consumes first consumption power P1.

From a first time t1, any request may not be provided from the host 10 to the memory controller. Therefore, a host idle interval (Host Idle) may occur from the first time t1.

In an embodiment, the host idle interval (Host Idle) may include an internal busy period (Internal Busy) and an internal idle period (Internal Idle).

For example, an internal busy period (Internal Busy) corresponding to a period from the first time t1 to a second time t2 may occur, and an internal idle period (Internal Idle) corresponding to a period from the second time t2 to a third time t3 may occur.

During the internal busy period (Internal Busy), the memory controller 100 does not perform an operation corresponding to a request of the host 10, but performs a background operation. In general, a power consumption amount required to perform the background operation is smaller than that required to perform the operation corresponding to the request of the host 10. Therefore, during the internal busy period (Internal Busy), the memory controller 100 consumes second consumption power P2 lower than the first consumption power P1.

Thus, a power consumption amount (e.g., P2) consumed during the internal busy period (Internal Busy) may be smaller than that (e.g., P1) consumed during the host busy period (Host Busy).

The request of the host 10 may be still not provided, and the background operation may be completed at the second time t2. The internal idle period (Internal Idle) may occur from the second time t2. During the internal idle period (Internal Idle), the memory controller 100 does not perform the operation corresponding to the request of the host 10 and the background operation. Therefore, during the internal idle period (Internal Idle), the memory controller 100 consumes third consumption power P3 lower than the second consumption power P2.

Thus, a power consumption amount (e.g., P3) consumed during the internal idle period (Internal Idle) may be smaller than that (e.g., P2) consumed during the internal busy period (Internal Busy).

The request of the host 10 may be still not provided, and the internal idle period (Internal Idle) may be maintained during a certain period. The memory controller 100 may determine the operation mode as the standby mode (Stand By).

In the standby mode (Stand By), some of the circuits included in the memory controller 100 may maintain a turn-off state. Therefore, the memory controller 100 which operates in the standby mode (Stand By) consumes fourth consumption power P4 lower than the third consumption power P3.

Thus, a power consumption amount in the standby mode (Stand By) is smaller than that consumed during the internal idle period (Internal Idle).

At a fourth time t4, the request (e.g., the (n+1)th request (REQn+1) shown in FIG. 2) of the host 10 may be provided to the storage device 20. The host busy period (Host Busy) may occur from the fourth time t4.

In response to that the host busy period (Host Busy) occurs, the memory controller 100 wakes up, and determines the operation mode as the active mode. Specifically, the memory controller 100 determines the operation mode as the active mode in response to the request (e.g., the (n+1)th request (REQn+1) shown in FIG. 2) of the host 10, which occurs in the standby mode. The circuits which are in the turn-off state among the circuits included in the memory controller 100 are changed to the turn-on state. The memory controller 100 performs an operation corresponding to an input/output signal (e.g., the (n+1)th request (REQn+1) of the host 10). During the period corresponding to the host busy period (Host Busy), the memory controller 100 which operates in the active mode consumes the first consumption power P1.

From the viewpoint of the operation mode, a power consumption amount in the active mode is greater than that in the standby mode (Stand By).

As described above, when an idle maintenance time elapses for a predetermined time or more, the memory controller operates in the standby mode, so that consumption power can be saved.

Figure 5:
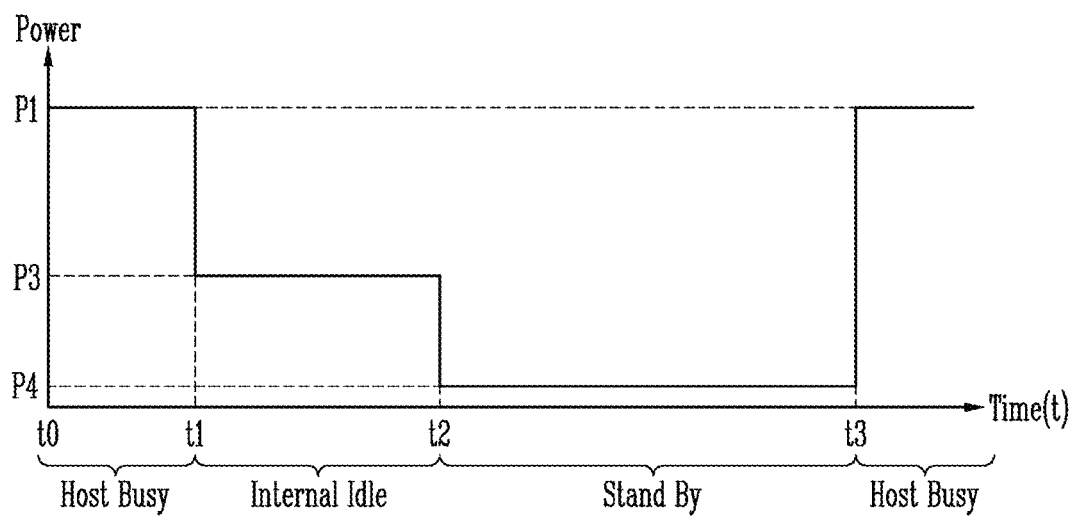
FIG. 5 is a diagram illustrating another embodiment in which the memory controller shown in FIG. 1 enters into the standby mode.

FIG. 5 is a diagram illustrating another embodiment in which the memory controller shown in FIG. 1 enters into the standby mode.

In the embodiment shown in FIG. 5, descriptions of portions identical to those shown in FIG. 4 will be omitted.

During a period corresponding to the host busy period (Host Busy), the memory controller 100 consumes first consumption power P1.

In an embodiment, the host idle interval (Host Idle) may include an internal idle period (Internal Idle).

During the internal idle period (Internal Idle), the memory controller 100 consumes third consumption power P3.

A power consumption amount consumed during the internal idle period (Internal Idle) is smaller than that consumed in the host busy period (Host Busy).

When any request is still not provided from the host 10, and the internal idle period (Internal Idle) is maintained during a certain period, the memory controller 100 determines an operation mode as the standby mode (Stand By). During the standby mode (Stand By), the memory controller 100 which operates in the standby mode consumes fourth consumption power P4 lower than the third consumption power P3.

A power consumption amount in the standby mode (Stand By) is smaller than that consumed during the internal idle period (Internal Idle).

In the standby mode (Stand By), the memory controller 100 receives a request from the host 10. In response to receiving the request from the host 10, the memory controller 100 determines the operation mode as the active mode. During the host busy period (Host Busy), the memory controller 100 operates in the active mode and consumes the first consumption power P1.

A power consumption amount in the active mode is greater than that in the standby mode (Stand By).

As described above, the memory controller 100 operates in the standby mode in case that the memory controller has been in the host idle state for a predetermined time or more. By operating in the standby mode, the consumption of power can be saved.

Input/output signals (e.g., nth input/output signal (IOn) and (n+1)th input/output signal (IOn+1) shown FIG. 2) may irregularly occur, and thus host idle intervals (Host Idle), which occurs according to the input/output signals, may not be constant as well. In this case, there may occur more frequent transitions between the active mode and the standby mode (Stand By), which makes it hard to reduce or save the consumption of power, and deteriorate the performance of the storage device 20. Accordingly, it may be helpful and advantageous to flexibly adjust a standby entry time according to a pattern of the host idle intervals (Host Idle) and to determine the standby mode by using the adjusted standby entry time.

Figure 6:
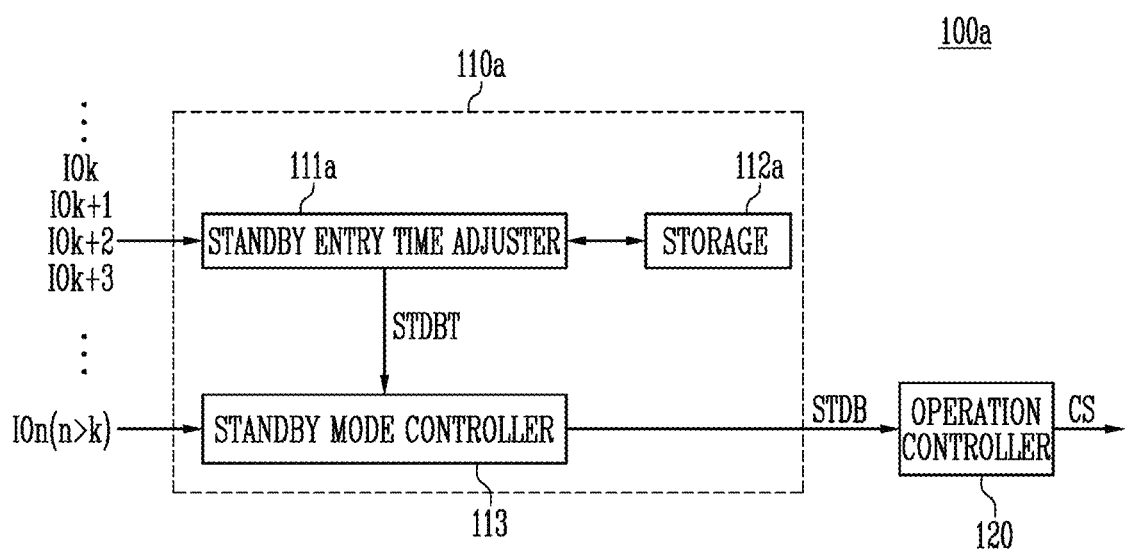
FIG. 6 is a diagram illustrating a memory controller in accordance with an embodiment of the disclosed technology.

FIG. 6 is a diagram illustrating a memory controller in accordance with an embodiment of the disclosed technology.

Referring to FIG. 6, the memory controller 100a in accordance with the embodiment of the disclosed technology may include an operation mode controller 110a and an operation controller 120 that are coupled to communicate. As illustrated, the operation mode controller 110a coupled to the operation controller 120 to send a standby mode instruction signal STDB to the operation controller 120.

The operation mode controller 110a shown in FIG. 6 may perform an operation of the operation mode controller 110 shown in FIG. 1.

The operation mode controller 110a shown in FIG. 6 may include a standby entry time adjuster 111a, a storage 112a, and a standby mode controller 113.

The standby entry time adjuster 111a may receive input/output signals, IOk, IOk+1, IOk+2, and IOk+3 (k is a positive integer). The input/output signals, IOk, IOk+1, IOk+2, and IOk+3, may be input/output signals which are successively generated.

The standby entry time adjuster 111a may acquire host idle intervals (Host Idle) by using the input/output signals, IOk, IOk+1, IOk+2, and IOk+3. For example, the standby entry time adjuster 111a may acquire, as a host idle interval (Host Idle), an interval between a response included in a kth input/output signal IOk and a request included in an (k+1)th input/output signal IOk+1.

The standby entry time adjuster 111a may adjust a standby entry time, based on a pattern of the host idle intervals (Host Idle).

For example, the standby entry time adjuster 111a may compare the host idle interval (Host Idle) with a reference interval. When the host idle interval (Host Idle) occurs plural times, the standby entry time adjuster 111a may compare each of the host idle intervals (Host Idle) with the reference interval.

The standby entry time adjuster 111a may adjust a standby entry time according to whether a first host idle interval or a second host idle interval is successively repeated. Thus, the standby entry time adjuster 111a may adjust the standby entry time based on a number of consecutive first host idle interval or a number of consecutive second host idle interval.

In an embodiment, the standby entry time adjuster 111a may decrease the standby entry time in case that the first host idle interval is successively repeated by a predetermined first reference number of times.

The first reference number of times may be a number of times, which is used to determine how many the first host idle interval that is longer than the reference interval is successively repeated.

In an embodiment, the standby entry time adjuster 111a may increase the standby entry time in case that the second host idle interval is successively repeated by a predetermined second reference number of times.

The second reference number may mean a number of times, which is used to determine how many the second host idle interval that is shorter than or equal to the reference interval is successively repeated.

In an embodiment, the first reference number of times may be a value greater than or equal to the second reference number of times.

In an embodiment, an adjusted standby entry time STDBT may be a value which is increased or decreased by a predetermined value from a predetermined reference standby entry time. The reference standby entry time may be predetermined through an experiment, a design, etc. before the storage device 20 is released, and be updated after the storage device 20 is released.

The standby entry time adjuster 111a may provide the standby mode controller 113 with information on the adjusted standby entry time STDBT.

The storage 112a may store data representing each of the host idle interval (Host Idle), the reference interval, a number of times, which is obtained by counting the first host idle interval, a number of times, which is obtained by counting the second host idle interval, a reference number of times, the adjusted standby entry time STDBT, and the reference standby entry time.

The standby mode controller 113 may receive an input/output signal IOn. The input/output signal IOn may be a signal generated next to the generation of the input/output signals IOk, IOk+1, IOk+2, and IOk+3. The input/output signal IOn may correspond to the nth input/output signal (IOn) shown in FIG. 2.

The standby mode controller 113 may acquire a subsequent host idle interval (Host Idle) by using the input/output signal IOn. For example, the standby mode controller 113 may acquire the subsequent host idle interval (Host Idle) by using a time at which a response (e.g., the nth response (RESn) shown in FIG. 2) included in the input/output signal IOn is provided to the host 10.

The standby mode controller 113 may compare the subsequent host idle interval with the adjusted standby entry time STDBT, and determine an operation mode, based on a comparison result.

For example, when the subsequent host idle interval exceeds the adjusted standby entry time STDBT, the standby mode controller 113 may output a standby mode instruction signal STDB to the operation controller 120.

The standby mode instruction signal STDB may be a signal instructing the operation controller 120 to perform a control operation according to the standby mode (Stand By).

In an embodiment, in the standby mode (Stand By), the standby mode controller 113 may determine the operation mode as the active mode in response to a subsequent request (e.g., the (n+1)th request (REQn+1) shown in FIG. 2) provided from the host 10.

In an embodiment, after the subsequent request is received, a value corresponding to the reference interval may be changed to be smaller than that of a currently adjusted standby entry time STDBT.

The operation controller 120 may control the memory device 200 in response to the standby mode instruction signal STDB. Alternatively, the operation controller 120 may control the power supply management device 300 in response to the standby mode instruction signal STDB. Specifically, the operation controller 120 may provide a control signal CS corresponding to the standby mode instruction signal STDB to at least one of the memory device 200 and the power supply management device 300.

Figure 7:
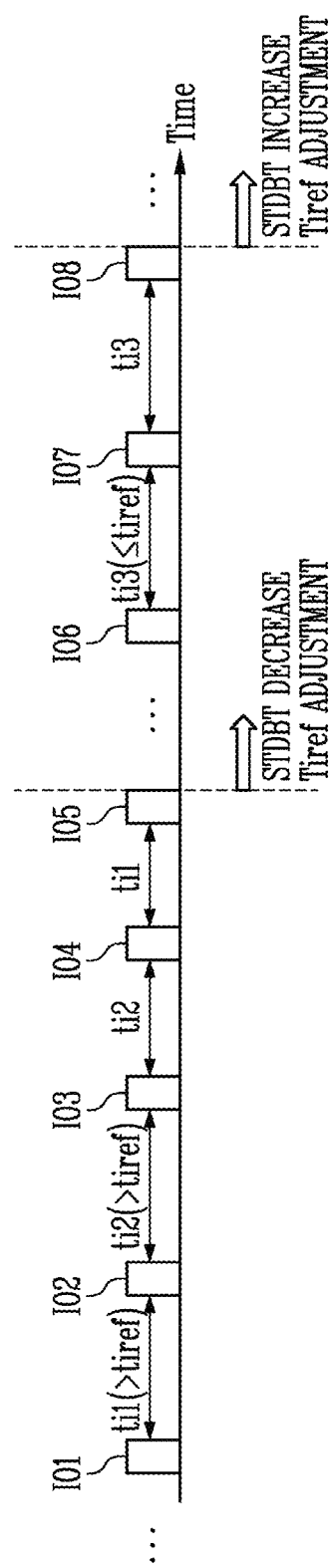
FIG. 7 is a diagram illustrating a method for adjusting a standby entry time in accordance with an embodiment of the disclosed technology.

FIG. 7 is a diagram illustrating a method for adjusting a standby entry time in accordance with an embodiment of the disclosed technology.

In a description of a specific example, for convenience, it is assumed that a first reference number of times is 4, first host idle intervals are ti1 and ti2, a second reference number of times is 2, and a second host idle interval is ti3. Here, ti1 and ti2 shown in FIG. 7 may be values equal to or different from each other. Although a case where only the ti3 corresponds to the second host idle interval is illustrated in FIG. 7, the disclosed technology is not limited thereto.

Referring to FIG. 7, in an embodiment, the standby entry time adjuster 111a may decrease the standby entry time in response to that the first host idle interval exceeding a reference interval tiref is repeated by the first reference number of times.

An example will be described with reference to FIGS. 2 and 7. An interval ti1 between a first input/output signal IO1 and a second input/output signal IO2 may be a first host idle interval. The standby entry time adjuster 111a may perform counting once. Also, the standby entry time adjuster 111a may store, in the storage 112a, data about each of the interval ti1 between the first input/output signal IO1 and the second input/output signal IO2 and the counted number of times. The total sum of a number of times the first host idle interval is counted may be once.

An interval ti2 between the second input/output signal IO2 and a third input/output signal IO3 may be a first host idle interval. Since the interval ti1 between the first input/output signal IO1 and the second input/output signal IO2 is stored in the storage 112a, it may be determined that the interval ti1 between the first input/output signal IO1 and the second input/output signal IO2 and the interval ti2 between second input/output signal IO2 and the third input/output signal IO3 are successively repeated. The standby entry time adjuster 111a may additionally perform counting once. Also, the standby entry time adjuster 111a may store, in the storage 112a, data about each of the interval ti2 between second input/output signal IO2 and the third input/output signal IO3 and the counted number of times. The total sum of a number of times the first host idle interval is counted may be twice.

The standby entry time adjuster 111a may determine whether the currently stored counted number of times corresponds to the first reference number of times. Since the currently stored total counted number of times is twice, the standby entry time adjuster 111a may maintain the standby entry time. The adjusted standby entry time STDBT may be maintained as the same as, for example, a predetermined reference standby entry time.

An interval ti2 between the third input/output signal IO3 and a fourth input/output signal IO4 may be a first host idle interval. Since the interval ti2 between the second input/output signal IO2 and the third input/output signal IO3 is additionally stored in the storage 112a, it may be determined that the interval ti2 between the third input/output signal IO3 and a fourth input/output signal IO4 is successively repeated, continuing to the previous intervals ti1 and ti2. The standby entry time adjuster 111a may additionally perform counting once. Also, the standby entry time adjuster 111a may store, in the storage 112a, data about each of the interval ti2 between third input/output signal IO3 and the fourth input/output signal IO4 and the counted number of times. The total sum of a number of times the first host idle interval is counted may be three times.

The standby entry time adjuster 111a may determine whether the currently stored counted number of times corresponds to the first reference number of times. Since the currently stored total counted number of times is three times, the standby entry time adjuster 111a may maintain the standby entry time.

An interval ti1 between the fourth input/output signal IO4 and a fifth input/output signal IO5 may be a first host idle interval. As described above, since the interval ti2 between third input/output signal IO3 and the fourth input/output signal IO4 is additionally stored in the storage 112a, it may be determined that the interval ti1 between the fourth input/output signal IO4 and the fifth input/output signal IO5 is successively repeated. The standby entry time adjuster 111a may additionally perform counting once. Also, the standby entry time adjuster 111a may store, in the storage 112a, data about each of the interval ti1 between the fourth input/output signal IO4 and the fifth input/output signal IO5 and the counted number of times. The total sum of a number of times the first host idle interval is counted may be four times.

Since the intervals ti1 and tit exceeding the reference intervals tiref are successively repeated, and the currently stored total counted number of times satisfies the first reference number of times, the standby entry time adjuster 111a may decrease the standby entry time.

In an embodiment, the adjusted standby entry time STDBT may have a value smaller than the reference standby entry time.

The standby mode controller 113 may determine whether the memory controller 100 is to enter into the standby mode (Stand By), based on the idle maintenance time and the decreased standby entry time STDBT.

In an embodiment, the standby entry time adjuster 111a may adjust the reference interval tiref, based on the decreased standby entry time STDBT.

Although not shown in the drawing, the standby entry time adjuster 111a may initialize the total counted number of times, which is stored in the storage 112a, after the decreased standby entry time STDBT occurs. The standby entry time adjuster 111a may further decrease the decreased standby entry time STDBT in response to that the first host idle interval is successively repeated by the first reference number of times after the total counted number of times is initialized.

As described above, in this embodiment, the standby entry time is decreased based on the pattern of the host idle intervals, so that consumption power can be further saved or reduced as much as the standby entry time becomes fast.

Referring to FIG. 7, in an embodiment, the standby entry time adjuster 111a may increase the standby entry time in response to that a second host idle interval smaller than or equal to the reference interval tiref is repeated by the second reference number of times.

An example will be described with reference to FIG. 7. An interval ti3 between a sixth input/output signal IO6 and a seventh input/output signal IO7 may be a second host idle interval. The standby entry time adjuster 111a may count that the second host idle interval is repeated once. Also, the standby entry time adjuster 111a may store, in the storage 112a, data about each of the interval ti3 between the sixth input/output signal IO6 and the seventh input/output signal IO7 and the counted number of times. The total sum of a number of times the second host idle interval is counted may be once.

An interval ti3 between the seventh input/output signal IO7 and an eighth input/output signal IO8 may be a second host idle interval. Since the interval ti3 between the sixth input/output signal IO6 and the seventh input/output signal IO7 is stored in the storage 112a, it may be determined that the second host idle interval is successively repeated. Therefore, the standby entry time adjuster 111a may additionally perform counting once. Also, the standby entry time adjuster 111a may store, in the storage 112a, data about each of the interval ti3 between the seventh input/output signal IO7 and the eighth input/output signal IO8 and the counted number of times. The total sum of a number of times the second host idle interval is counted may be twice.

The standby entry time adjuster 111a may determine whether the stored counted number of times corresponds to the second reference number of times. Since the interval ti3 which is the reference interval tiref or less is successively repeated, and the currently stored total counted number of times satisfies the second reference number of times, the standby entry time adjuster 111a may increase the standby entry time.

In an embodiment, the second reference number of times may have a value smaller than the first reference number of times. For example, when the first reference number of times is 4, the second reference number may be 2. When the first reference number of times has a value greater than the second reference number of times, the standby entry time is prevented from being excessively decreased, a change operation between the active mode and the standby mode is prevented from occurring relatively frequently, and the performance of the storage device is prevented from be excessively decreased.

Although not shown in the drawing, the standby entry time adjuster 111a may initialize the total counted number of times, which is stored in the storage 112a after the increased standby entry time STDBT occurs. The standby entry time adjuster 111a may additionally increase the increased standby entry time STDBT in response to that the interval ti3 is successively repeated by the second reference number of times after the total counted number of times is initialized.

As described above, in this embodiment, the decreased standby entry time is again increased, so that the change operation between the active mode and the standby mode can be prevented from occurring frequently. Accordingly, the performance of the storage device can be prevented from be excessively decreased.

Further, as described above, in this embodiment, consumption power can be saved while not excessively deteriorating the performance of the storage device.

Figure 8:
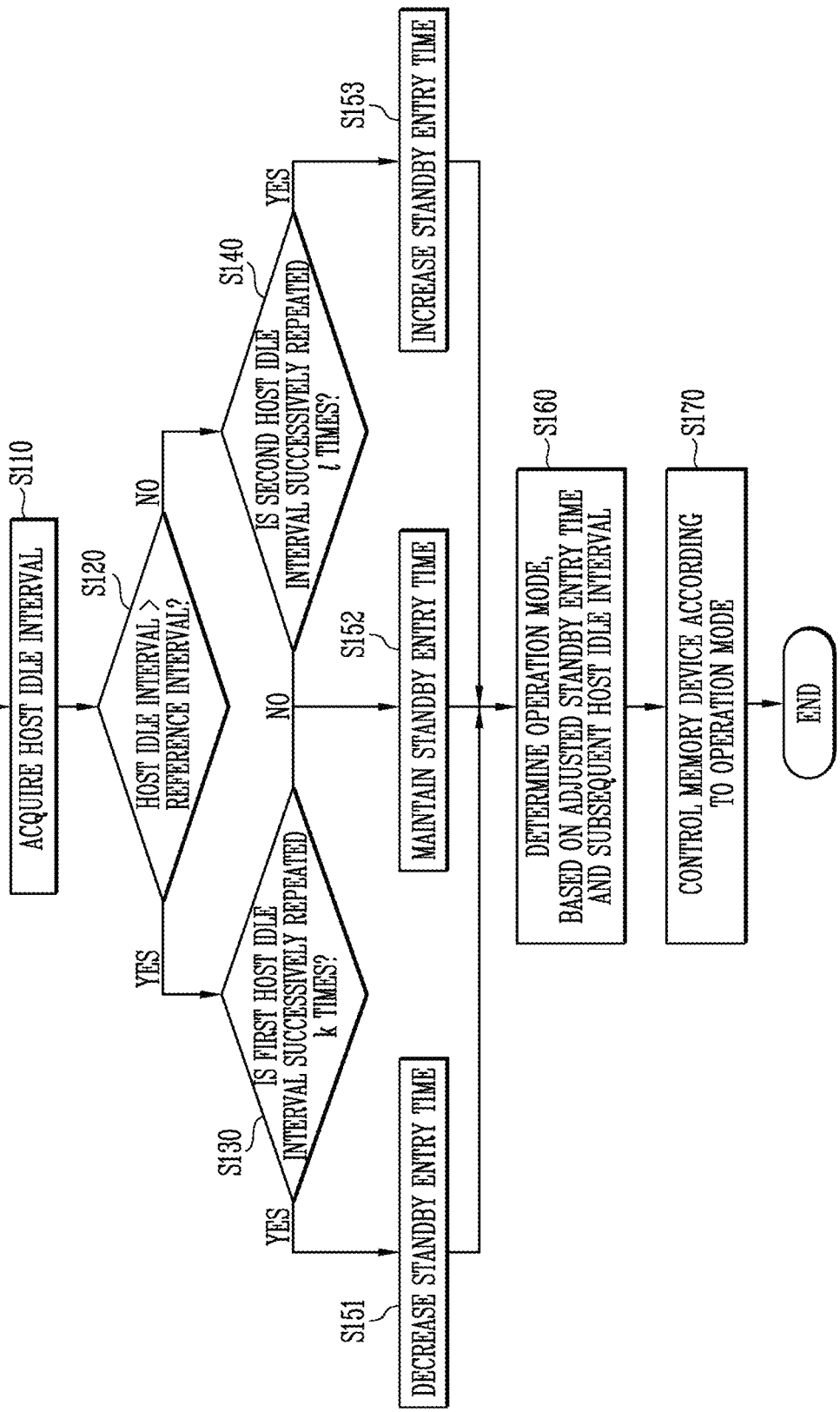
FIG. 8 is a flowchart illustrating an operating method of the memory controller shown in FIG. 6.

FIG. 8 is a flowchart illustrating an operating method of the memory controller shown in FIG. 6.

Referring to FIG. 8, the memory controller 100a acquires a host idle interval (Host Idle) (S110). When a plurality of input/output signals (e.g., the input/output signals IOk, IOk+1, IOk+2, and IOk+3) are generated, the memory controller 100a may acquire host idle intervals (Host Idle).

The memory controller 100a determines whether the host idle interval (Host Idle) exceeds a reference interval tiref (S120).

When the host idle interval (Host Idle) exceeds the reference interval tiref (S120, YES), the memory controller 100a determines whether a first host idle interval (e.g., ti1 and tit shown in FIG. 7) is successively repeated k times (S130).

When the host idle interval (Host Idle) is smaller than or equal to the reference interval tiref (S120, NO), the memory controller 100a determines whether a second host idle interval (e.g., ti3) smaller than or equal to the reference interval tiref is successively repeated l times (S140).

Here, k and l may be natural numbers, and be values equal to or different from each other. In an embodiment, k may have a value greater than l.

When the first host idle interval (e.g., ti1 and ti2) is successively repeated k times (S130, YES), the memory controller 100a decreases a standby entry time (S151).

When the second host idle interval (e.g., ti3) is successively repeated l times (S140, YES), the memory controller 100a increases the standby entry time (S153).

When the first host idle interval (e.g., ti1 and ti2) is not successively repeated k times (S130, NO), the memory controller 100a maintains the standby entry time (S152).

When the second host idle interval (e.g., ti3) is not successively repeated l times (S140, NO), the memory controller 100a maintains the standby entry time (S152).

The memory controller 100a determines an operation mode, based on an adjusted standby entry time STDBT and a subsequent host idle interval (S160). For example, the memory controller 100a determines the operation mode as the standby mode (Stand By) in response to the subsequent host idle interval exceeding the adjusted standby entry time.

The memory controller 100a controls the memory device according to the operation mode (S170).

Figure 9:
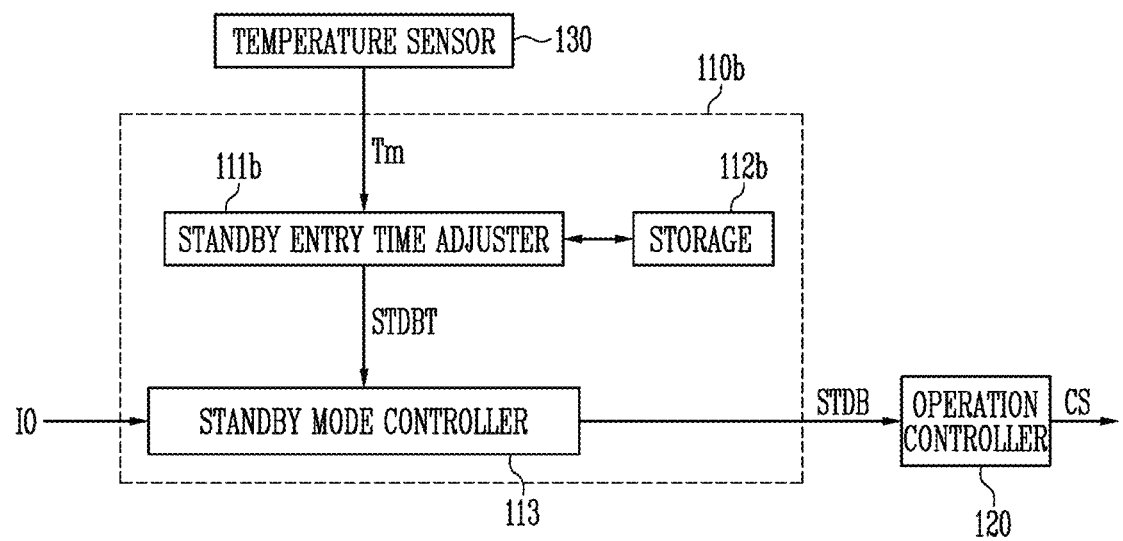
FIG. 9 is a diagram illustrating a memory controller in accordance with another embodiment of the disclosed technology.

FIG. 9 is a diagram illustrating a memory controller in accordance with another embodiment of the disclosed technology.

In FIG. 9, descriptions of components identical to those shown in FIG. 6 will be omitted, and portions different from those shown in FIG. 6 will be mainly described.

Referring to FIG. 9, the memory controller 100b in accordance with another embodiment of the disclosed technology may include an operation mode controller 110b, an operation controller 120, and a temperature sensor 130.

The operation mode controller 110b shown in FIG. 9 may perform a function of the operation mode controller 110 shown in FIG. 1.

The operation mode controller 110b shown in FIG. 9 may adjust a standby entry time, based on an internal temperature Tm, and determine an operation mode, based on a host idle interval and an adjusted standby entry time STDBT.

The operation mode controller 110b shown in FIG. 9 may include a standby entry time adjuster 111b, a storage 112b, and a standby mode controller 113.

The standby entry time adjuster 111b may receive information on an internal temperature Tm from the temperature sensor 130, and adjust a standby entry time, based on the internal temperature Tm.

In an embodiment, the standby entry time adjuster 111b may select a standby entry time STDBT corresponding to the internal temperature Tm in a predetermined lookup table. Also, the standby entry time adjuster 111b may output a signal representing the selected standby entry time STDBT.

In an embodiment, the lookup table may be a table including the standby entry time STDBT according to the internal temperature Tm. The lookup table may be predetermined through an experiment, a design, etc. before the storage device 20 is released, and be updated after the storage device 20 is released.

The internal temperature Tm may mean, for example, an internal temperature of the storage device 20, and be measured by the temperature sensor 130.

The storage 112b may store data about each of the internal temperature Tm, the standby entry time STDBT, and a reference standby entry time, and the lookup table.

The temperature sensor 130 may exist at the outside of the operation mode controller 110b as shown in FIG. 9. However, the disclosed technology is not limited thereto. Although not shown in the drawing, the temperature sensor 130 may be included in the operation mode controller 110b. Although not shown in the drawing, the temperature sensor 130 may exist at the outside of the memory controller 100b.

Figure 10:
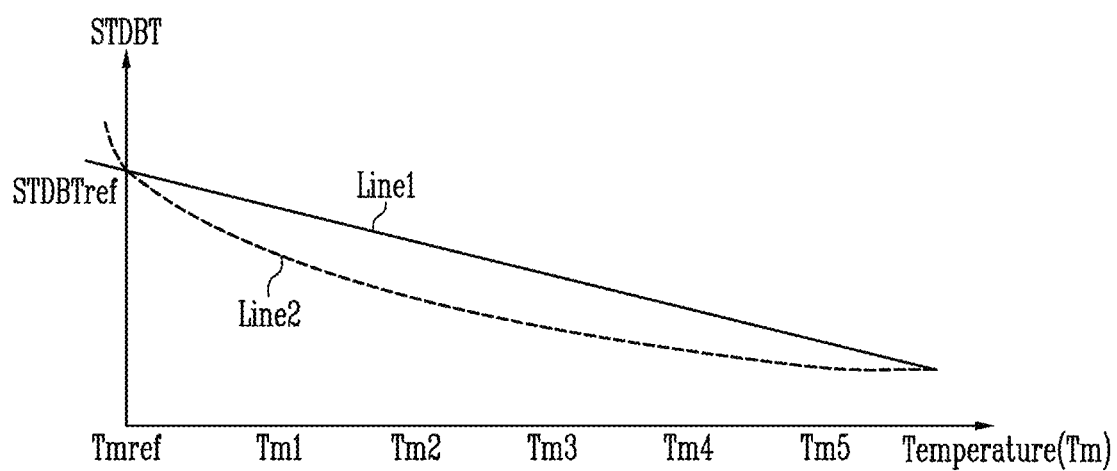
FIG. 10 is a graph schematically illustrating standby entry time adjusted based on internal temperature.

FIG. 10 is a graph schematically illustrating standby entry time adjusted based on internal temperature.

Referring to FIG. 10, when the internal temperature Tm increases, circuits included in the memory controller 100b, the memory device 200, or the power supply management device 300 may be damaged by heat, which can cause the deterioration of the performance of the storage device 20.

In accordance with the another embodiment of the disclosed technology, the memory controller 100b may adjust the standby entry time STDBT based on the internal temperature Tm so as to prevent the performance of the storage device 20 from being deteriorated due to the increase of the internal temperature Tm.

In an embodiment, as the internal temperature Tm increases, the standby entry time STDBT may be decreased by the standby entry time adjuster 111b. An example will be described with reference to FIG. 10. The standby entry time STDBT may be gradually decreased as the internal temperature Tm increases from a first internal temperature Tm1 to a fifth internal temperature Tm5.

In an embodiment, the standby entry time STDBT may be increased by the standby entry time adjuster 111b as the internal temperature Tm decreases. An example will be described with reference to FIG. 10. The standby entry time STDBT may be gradually increased as the internal temperature Tm decreases from the fifth internal temperature Tm5 to the first internal temperature Tm1.

In an embodiment, the standby entry time STDBT according to the internal temperature Tm may be linearly changed, like a first graph Line1 shown in FIG. 10.

In an embodiment, the standby entry time STDBT according to the internal temperature Tm may be nonlinearly changed, like a second graph Line2 shown in FIG. 10.

In an embodiment, standby entry times STDBT respectively corresponding to internal temperatures (e.g., Tm1, Tm2, Tm3, Tm4, and Tm5) higher than a reference internal temperature Tmref may have values smaller than a reference standby entry time STDBTref.

In an embodiment, standby entry times STDBT respectively corresponding to internal temperatures lower than the reference internal temperature Tmref may have values greater than the reference standby entry time STDBTref.

In an embodiment, standby entry times STDBT corresponding to an internal temperature equal to the reference internal temperature Tmref may have values equal to the reference standby entry time STDBTref.

As described above, in this embodiment, the standby entry time is flexibly adjusted according to the internal temperature, so that heat loss of the storage device can be prevented.

Further, as described above, in this embodiment, the heat loss of the storage device is prevented, so that the performance of the storage device can be prevented from being deteriorated.

Furthermore, as described above, in this embodiment, the standby entry time is flexibly adjusted according to the internal temperature, so that consumption power can be reduced or saved while not excessively deteriorating the performance of the storage device.

Figures 11, 12:
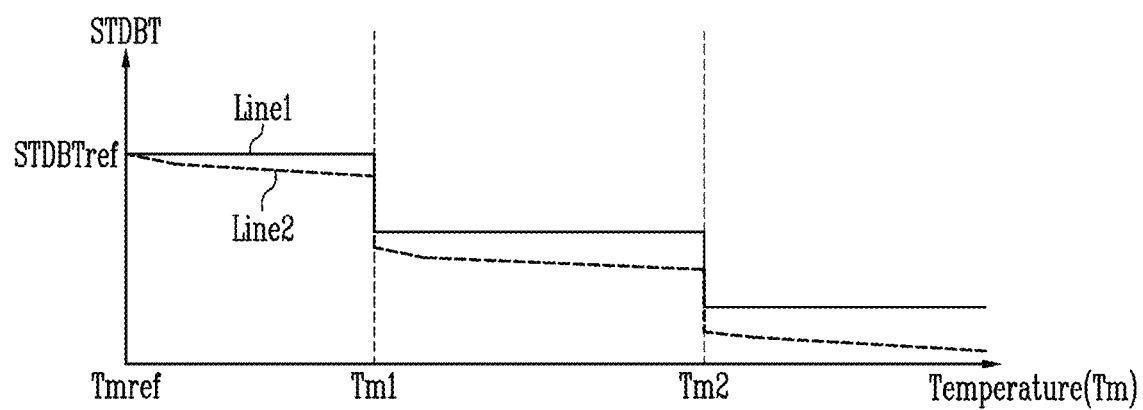
FIG. 11 is a diagram exemplarily illustrating a first lookup table including standby entry time according to internal temperature.
FIG. 12 is a graph schematically illustrating standby entry time calculated based on internal temperature.

FIG. 11 is a diagram exemplarily illustrating a first lookup table including standby entry time according to internal temperature.

Referring to FIG. 11, the memory controller 100b may include the storage 112b which stores a first lookup table LUT1 including a standby entry time STDBT according to an internal temperature Tm.

In an embodiment, the internal temperature Tm and the standby entry time STDBT may correspond one-to-one to each other in the first lookup table LUT1.

For example, a reference internal temperature Tmref and a reference standby entry time STDBTref may correspond one-to-one to each other in the first lookup table LUT1. A first internal temperature Tm1 and a first standby entry time STDBT1 may correspond one-to-one to each other in the first lookup table LUT1. A second internal temperature Tm2 and a second standby entry time STDBT2 may correspond one-to-one to each other in the first lookup table LUT1. A third internal temperature Tm3 and a third standby entry time STDBT3 may correspond one-to-one to each other in the first lookup table LUT1. A fourth internal temperature Tm4 and a fourth standby entry time STDBT4 may correspond one-to-one to each other in the first lookup table LUT1. A fifth internal temperature Tm5 and a fifth standby entry time STDBT5 may correspond one-to-one to each other in the first lookup table LUT1.

In an embodiment, when the first internal temperature Tm1 to the fifth internal temperature Tm5 are higher than the reference internal temperature Tmref, the first standby entry time STDBT1 to the fifth standby entry time STDBT5 may have values smaller than the reference standby entry time STDBTref.

In an embodiment, the internal temperature Tm may gradually increase in an order from the first internal temperature Tm1 to the fifth internal temperature Tm5. That is, the first internal temperature Tm1 among the internal temperatures Tm1, Tm2, Tm3, Tm4, and Tm5 may be lowest, and the fifth internal temperature Tm5 among the internal temperatures Tm1, Tm2, Tm3, Tm4, and Tm5 may be highest. However, the disclosed technology is not limited thereto.

In an embodiment, when the internal temperature Tm increases in the order from the first internal temperature Tm1 to the fifth internal temperature Tm5, the value of the standby entry time STDBT may decrease in an order from the first standby entry time STDBT1 to the fifth standby entry time STDBT5.

In an embodiment, the standby entry time adjuster 111b may select a standby entry time STDBT according to a current measured internal temperature Tm in the first lookup table LUT1. For example, when the currently measured internal temperature is the first internal temperature Tm1, the standby entry time adjuster 111b may select the first standby entry time STDBT1 corresponding to the first internal temperature Tm1 in the first lookup table LUT1.

FIG. 12 is a graph schematically illustrating standby entry time calculated based on internal temperature.

Referring to FIG. 12, a first internal temperature range among internal temperature ranges may be a range including a reference internal temperature Tmref to a first internal temperature Tm1. A second internal temperature range among the internal temperature ranges may be a range including the first internal temperature Tm1 to a second internal temperature Tm2. A third internal temperature range among the internal temperature ranges may be the second internal temperature Tm2 or higher.

An example of the above-described internal temperature ranges is merely for helping understanding of these embodiments, and the disclosed technology is not limited thereto. Hereinafter, a case where the number of internal temperature ranges is 3 is assumed for convenience.

A maximum value (e.g., Tm1) of the first internal temperature range (e.g., Tmref to Tm1) among the internal temperature ranges may be equal to or smaller than a minimum value (e.g., Tm1) of the second internal temperature range (e.g., Tm1 to Tm2) among the internal temperature ranges. In addition, a maximum value (e.g., Tm2) of the second internal temperature range (e.g., Tm1 to Tm2) among the internal temperature ranges may be equal to or smaller than a minimum value (e.g., Tm2) of the third internal temperature range (e.g., Tm2 or more) among the internal temperature ranges.

In an embodiment, when the maximum value (e.g., Tm1) of the first internal temperature range (e.g., Tmref to Tm1) is equal to or smaller than the minimum value (e.g., Tm1) of the second internal temperature range (e.g., Tm1 to Tm2), a standby entry time STDBT corresponding to the first internal temperature range (e.g., Tmref to Tm1) may have a value greater than a standby entry time STDBT corresponding to the second internal temperature range (e.g., Tm1 to Tm2). In addition, when the maximum value (e.g., Tm2) of the second internal temperature range (e.g., Tm1 to Tm2) is equal to or smaller than the minimum value (e.g., Tm2) of the third internal temperature range (e.g., Tm2 or more), the standby entry time STDBT corresponding to the second internal temperature range (e.g., Tm1 to Tm2) may have a value greater than a standby entry time STDBT corresponding to the third internal temperature range (e.g., Tm2 or more).

In an embodiment, a standby entry time STDBT corresponding to each of the internal temperature ranges may be changed according to the internal temperature Tm, like a second graph Line2 shown in FIG. 12. Like the graphs (Line1 and Line2 shown in FIG. 9), the second graph Line2 shown in FIG. 12 may be a graph in which the standby entry time STDBT is linearly or nonlinearly decreased as the internal temperature Tm increases.

In an embodiment, when a currently measured internal temperature Tm is included in any one internal temperature range among a plurality of internal temperature ranges, the standby entry time adjuster 111b may select a standby entry time STDBT corresponding to the internal temperature range, thereby calculating the standby entry time STDBT.

An example will be described with reference to FIG. 12. When the currently measured internal temperature Tm is included in the first internal temperature range (e.g., Tmref to Tm1), the standby entry time adjuster 111b may select a standby entry time STDBT having a value which is a reference standby entry time STDBTref or less.

Although not shown in the drawing, standby entry times STDBT respectively corresponding to internal temperatures lower than the reference internal temperature Tmref may have values greater than the reference standby entry time STDBTref.

As described above, in this embodiment, the standby entry time is flexibly adjusted according to the internal temperature, so that heat loss of the storage device can be prevented, and consumption power can be saved while not excessively deteriorating the performance of the storage device.

FIG. 13 is a diagram exemplarily illustrating a second lookup table including standby entry time according to internal temperature.

Referring to FIG. 13, the memory controller 100b may include the storage 112b which stores a second lookup table LUT2 including a standby entry time STDBT according to an internal temperature range.

In an embodiment, the internal temperature range and the standby entry time STDBT may correspond to each other in the second lookup table LUT2.

For example, a first internal temperature range (e.g., Tmref to Tm1) and a first standby entry time STDBT1 may correspond to each other in the second lookup table LUT2. A second internal temperature range (e.g., Tm1 to Tm2) and a second standby entry time STDBT2 may correspond to each other in the second lookup table LUT2. A third internal temperature range (e.g., Tm2 or higher) and a third standby entry time STDBT3 may correspond to each other in the second lookup table LUT2.

In an embodiment, the first standby entry time STDBT1 may have a value greater than the second standby entry time STDBT2, and the second standby entry time STDBT2 may have a value greater than the third standby entry time STDBT3.

Figure 14:
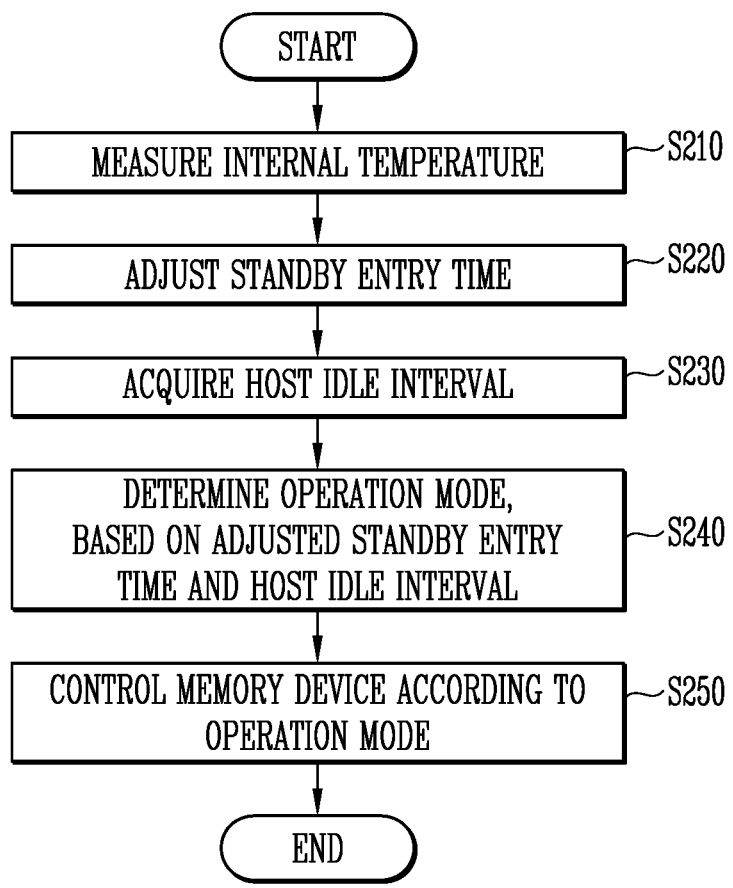
FIG. 14 is a flowchart illustrating an operating method of the memory controller shown in FIG. 9.

FIG. 14 is a flowchart illustrating an operating method of the memory controller shown in FIG. 9.

Referring to FIG. 14, the temperature sensor 130 included in the memory controller 100b measures an internal temperature Tm (S210).

The memory controller 100b adjusts a standby entry time, based on the measured internal temperature Tm (S220).

The memory controller 100b acquires a host idle interval (Host Idle) (S230).

The memory controller 100b determines an operation mode, based on the adjusted standby entry time STDBT and the host idle interval (Host Idle) (S240). For example, the memory controller 100b determines the operation mode as a standby mode (Stand By), as the host idle interval (Host Idle) exceeds the adjusted standby entry time STDBT. The host idle interval (Host Idle) may be the subsequent host idle interval (Host Idle) described with reference to FIG. 8.

The memory controller 100b controls the memory device according to the operation mode (S250).

Figure 15:
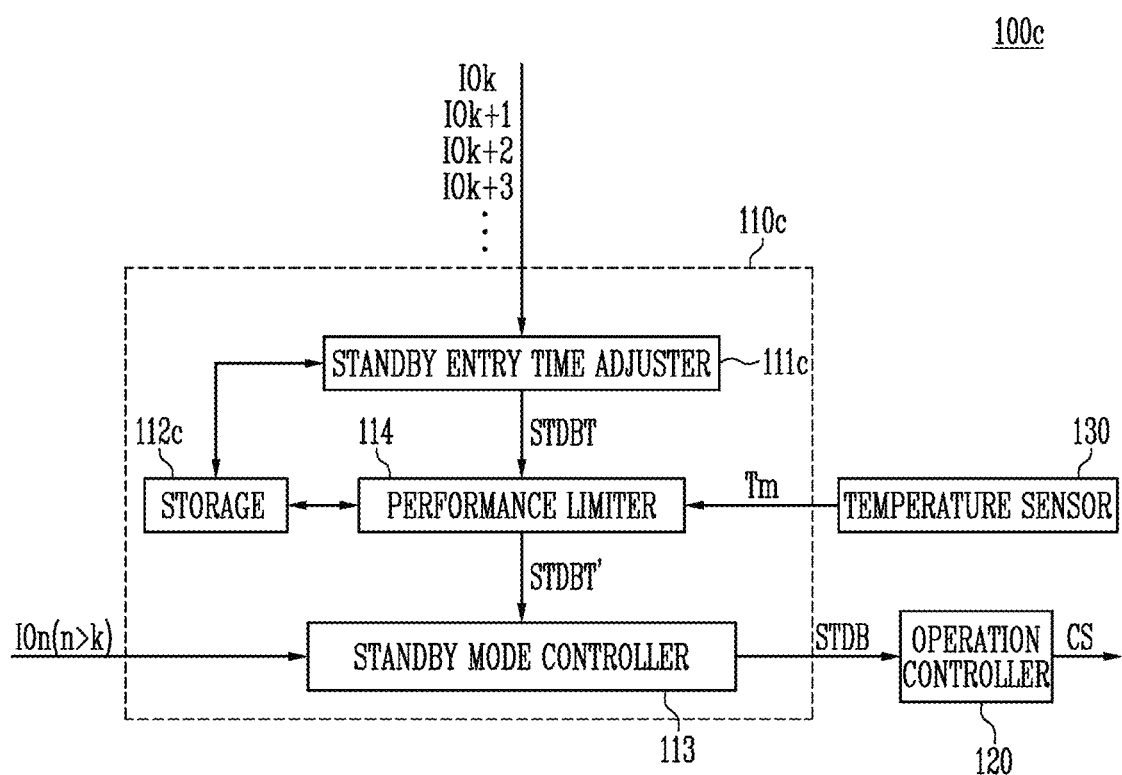
FIG. 15 is a modification of the memory controller shown in FIG. 6.

FIG. 15 is a modification of the memory controller shown in FIG. 6.

In FIG. 15, descriptions of components identical to those shown in FIGS. 6 and 9 will be omitted, and portions different from those shown in FIGS. 6 and 9 will be mainly described.

Referring to FIG. 15, the memory controller 100c shown in FIG. 15 may include an operation mode controller 110c, an operation controller 120, and a temperature sensor 130.

The operation mode controller 110c shown in FIG. 15 may perform a function of the operation mode controller 110 shown in FIG. 1.

The operation mode controller 110c shown in FIG. 15 may include a standby entry time adjuster 111c, a storage 112c, a standby mode controller 113, and a performance limiter 114.

The standby entry time adjuster 111c shown in FIG. 15 may perform the same function as the standby entry time adjuster 111a shown in FIG. 6.

The storage 112c may store data about each of a host idle interval (Host Idle), a reference interval tiref, a number of times a first host idle interval is counted, a number of times a second host idle interval is counted, a first reference number of times, a second reference number of times, an internal temperature Tm, a standby entry time STDBT, and a reference standby entry time STDBTref, and a lookup table.

The performance limiter 114 may receive a signal representing a standby entry time STDBT adjusted by the standby entry time adjuster 111c. Also, the performance limiter 114 may receive a signal representing an internal temperature Tm output from the temperature sensor 130. Also, the performance limiter 114 may receive information on the lookup table stored in the storage 112c. Also, the performance limiter 114 may correct the adjusted standby entry time STDBT, based on the internal temperature Tm.

In an embodiment, the performance limiter 114 may select a corrected standby entry time STDBT' with reference to a predetermined lookup table. The corrected standby entry time STDBT' may be data about a time mapped to the adjusted standby entry time STDBT and the internal temperature Tm in the lookup table. The performance limiter 114 may provide the standby mode controller 113 with a signal representing the corrected standby entry time STDBT'.

The standby mode controller 113 may determine an operation mode, based on a subsequent host idle interval Host Idle and the corrected standby entry time STDBT'.

In an embodiment, when the subsequent host idle interval Host Idle exceeds the corrected standby entry time STDBT, the standby mode controller 113 may determine the operation mode as the standby mode.

FIG. 16 is a diagram exemplarily illustrating a third lookup table including information on a relationship between standby entry time and internal temperature.

Referring to FIG. 16, the memory controller 100c may include the storage 112c which stores a third lookup table LUT3.

The third lookup table LUT3 may include information on a relationship between a standby entry time STDBT and an internal temperature Tm. The information on the relationship between the standby entry time STDBT and the internal temperature Tm may include an adjustment coefficient determined according to the standby entry time STDBT and the internal temperature Tm or a corrected standby entry time STDBT' corresponding to a value obtained by multiplying the standby entry time STDBT by the adjustment coefficient. The adjustment coefficient reflected to the corrected standby entry time STDBT' may be pre-calculated according to a standby entry time STDBT and an internal temperature Tm, which are measured.

In an embodiment, a plurality of internal temperatures Tm may be divided into a plurality of internal temperature ranges in the third lookup table LUT3.

An example will be described with reference to FIG. 16. A first internal temperature range among the internal temperature ranges may be a range including a first internal temperature Tm1 and a second internal temperature Tm2. A second internal temperature range among the internal temperature ranges may be a range including the second internal temperature Tm2 and a third internal temperature Tm3. A third internal temperature range among the internal temperature ranges may be a range including the third internal temperature Tm3 and a fourth internal temperature Tm4. A fourth internal temperature range among the internal temperature ranges may be a range including the fourth internal temperature Tm4 and a fifth internal temperature Tm5.

An example of the above-described internal temperature ranges is merely for helping understanding of these embodiments, and the disclosed technology is not limited thereto. Hereinafter, a case where four internal temperature ranges and three standby entry times are included in the third lookup table LUT3 is assumed for convenience.

In an embodiment, the performance limiter 114 may select a corrected standby entry time STDBT' mapped to a currently measured internal temperature Tm and a currently adjusted standby entry time STDBT in the third lookup table LUT3.

For example, when the standby entry time STDBT is a first standby entry time STDBT1, and the currently measured internal temperature Tm is included in the first internal temperature range (Tm1 to Tm2), the corrected standby entry time STDBT' may be a value obtained by reflecting an adjustment coefficient a1 to the first standby entry time STDBT1. Therefore, the performance limiter 114 may select, as the corrected standby entry time STDBT, the value obtained by reflecting an adjustment coefficient a1 to the first standby entry time STDBT1.

The value obtained by reflecting an adjustment coefficient a1 to the first standby entry time STDBT1 may be, for example, a value obtained by multiplying the first standby entry time STDBT1 by the adjustment coefficient a1, but the disclosed technology is not limited thereto.

In an embodiment, in the third lookup table LUT3, at least one adjustment coefficient of a specific standby entry time may have a value different from at least one adjustment coefficient of a standby entry time different from the specific standby entry time.

An example will be described with reference to FIG. 16. At least one (e.g., a1) of adjustment coefficients a1 to a4 of the first standby entry time STDBT1 may have a value different from at least one (e.g., b1) of adjustment coefficients b1 to b4 of a second standby entry time STDBT2.

In an embodiment, in the third lookup table LUT3, at least one adjustment coefficient of a specific standby entry time may have the same value as at least one adjustment coefficient of another standby entry time.

An example will be described with reference to FIG. 16. At least one (e.g., a1) of the adjustment coefficients a1 to a4 of the first standby entry time STDBT1 may have the same value as at least one (e.g., b1) of the adjustment coefficients b1 to b4 of the second standby entry time STDBT2.

In an embodiment, in the third lookup table LUT3, at least one adjustment coefficient according to a specific internal temperature range may have a value different from at least one adjustment coefficient of an internal temperature range different from the specific internal temperature range.

An example will be described with reference to FIG. 16. At least one (e.g., c1) of adjustment coefficients a1, b1, and c1 according to the first internal temperature range Tm1 to Tm2 may have a value different from at least one (e.g., c2) of adjustment coefficients a2, b2, and c2 according to the second internal temperature range Tm2 to Tm3.

In an embodiment, in the third lookup table LUT3, at least one adjustment coefficient according to a specific internal temperature range may have the same value as at least one adjustment coefficient according to another internal temperature range.

An example will be described with reference to FIG. 16. At least one (e.g., c1) of the adjustment coefficients a1, b1, and c1 according to the first internal temperature range Tm1 to Tm2 may have the same value as at least one (e.g., c2) of the adjustment coefficients a2, b2, and c2 according to the second internal temperature range Tm2 to Tm3.

As described above, in this embodiment, the standby entry time is decreased, so that consumption power can be further saved as much as the standby entry time becomes fast.

Further, as described above, the decreased standby entry time is again increased, so that the change operation between the active mode and the standby mode can be prevented from occurring frequently. Accordingly, the performance of the storage device can be prevented from be excessively decreased.

Furthermore, as described above, in this embodiment, consumption power can be saved while not excessively deteriorating the performance of the storage device.

Furthermore, as described above, in this embodiment, the standby entry time is flexibly adjusted according to the internal temperature, so that heat loss of the storage device can be prevented.

Furthermore, as described above, in this embodiment, the heat loss of the storage device is prevented, so that the lifetime of the storage device can be increased.

Figure 17:
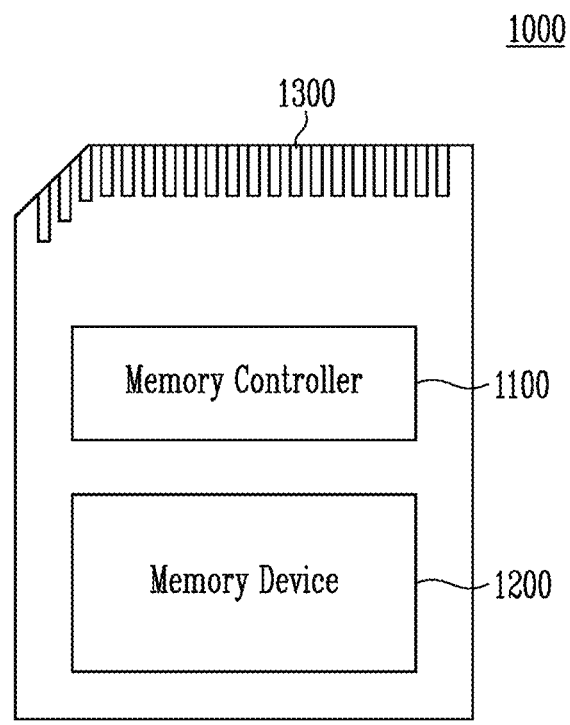
FIG. 17 is a block diagram illustrating a memory card system to which the storage device is applied in accordance with an embodiment of the disclosed technology.

FIG. 17 is a block diagram illustrating a memory card system to which the storage device is applied in accordance with an embodiment of the disclosed technology.

Referring to FIG. 17, the memory card system 1000 includes a memory controller 1100, a memory device 1200, and a connector 1300.

The memory controller 1100 is connected to the memory device 1200. The memory controller 1100 may access the memory device 1200. For example, the memory controller 1100 may control read, write, erase, and background operations of the memory device 1200. The memory controller 1100 provides an interface between the memory device 1200 and the host 10 (see FIG. 1). The memory controller 1100 drives firmware for controlling the memory device 1200.

Exemplarily, the memory controller 1100 may include components such as a Random Access Memory (RAM), a processing unit, a host interface, a memory interface, and an ECC circuit.

The memory controller 1100 may communicate with an external device through the connector 1300. The memory controller 1100 may communicate with the external device (e.g., the host) according to a specific communication protocol. Exemplarily, the memory controller 1100 may communicate with the external device through at least one of various communication protocols. Examples of the communication protocols may be a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 1300 may be defined by at least one of the above-described various communication protocols.

Exemplarily, the memory device 1200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 1100 and the memory device 1200 may be integrated into a single semiconductor device, to constitute a memory card. For example, the memory controller 1100 and the memory device 1200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 18:
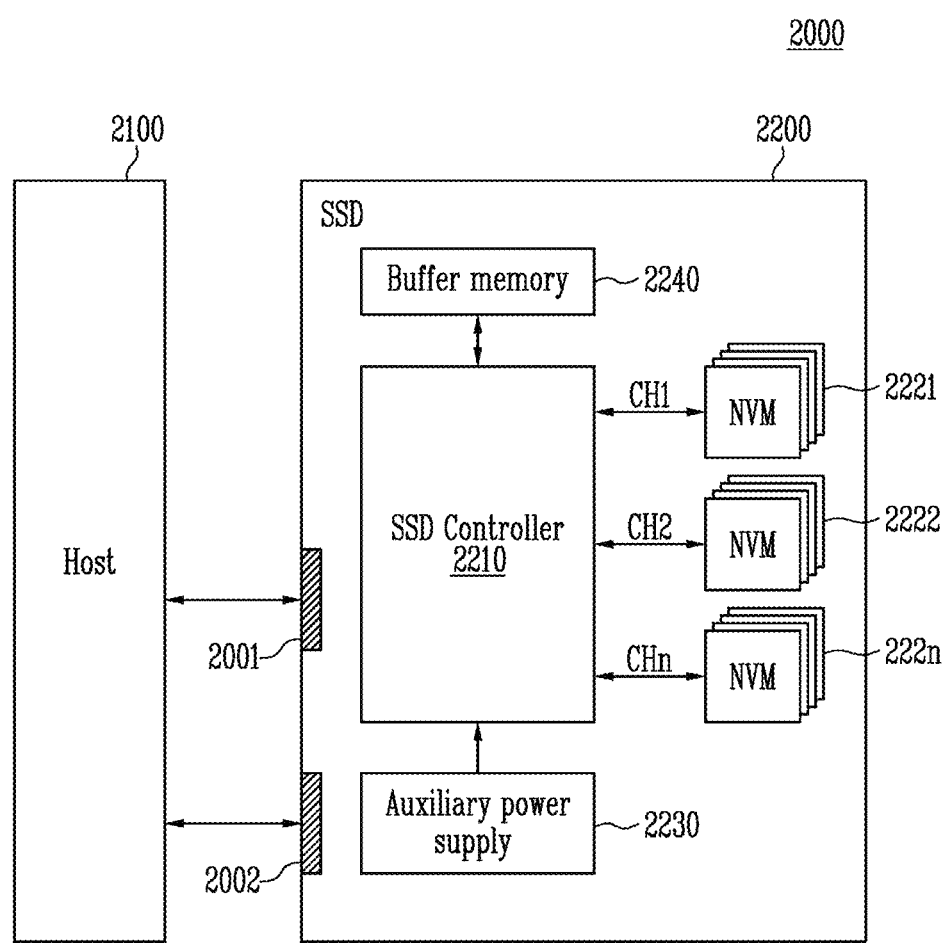
FIG. 18 is a block diagram exemplarily illustrating a Solid State Drive (SSD) system to which the storage device is applied in accordance with an embodiment of the disclosed technology.

FIG. 18 is a block diagram exemplarily illustrating a Solid State Drive (SSD) system to which the storage device is applied in accordance with an embodiment of the disclosed technology.

Referring to FIG. 18, the SSD system 2000 includes a host 2100 and an SSD 2200. The SSD 2200 exchanges a signal with the host 2100 through a signal connector 2001, and receives power through a power connector 2002. The SSD 2200 includes an SSD controller 2210, a plurality of flash memories 2221 to 222n, an auxiliary power supply 2230, and a buffer memory 2240.

In accordance with an embodiment of the disclosed technology, the SSD controller 2210 may serve as the memory controller 200 described with reference to FIG. 1.

The SSD controller 2210 may control the plurality of flash memories 2221 to 222n in response to a signal received from the host 2100. In an example, the signal may be a signal based on an interface between the host 2100 and the SSD 2200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 2230 is connected to the host 2100 through the power connector 2002. When the supply of power from the host 2100 is not smooth, the auxiliary power supply 2230 may provide power of the SSD 2200. In an example, the auxiliary power supply 2230 may be located in the SSD 2200, or be located at the outside of the SSD 2200. For example, the auxiliary power supply 2230 may be located on a main board, and provide auxiliary power to the SSD 2200.

The buffer memory 2240 operates as a buffer memory of the SSD 2200. For example, the buffer memory 2240 may temporarily store data received from the host 2100 or data received from the plurality of flash memories 2221 to 222n, or temporarily store meta data (e.g., a mapping table) of the flash memories 2221 to 222n. The buffer memory 2240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 19:
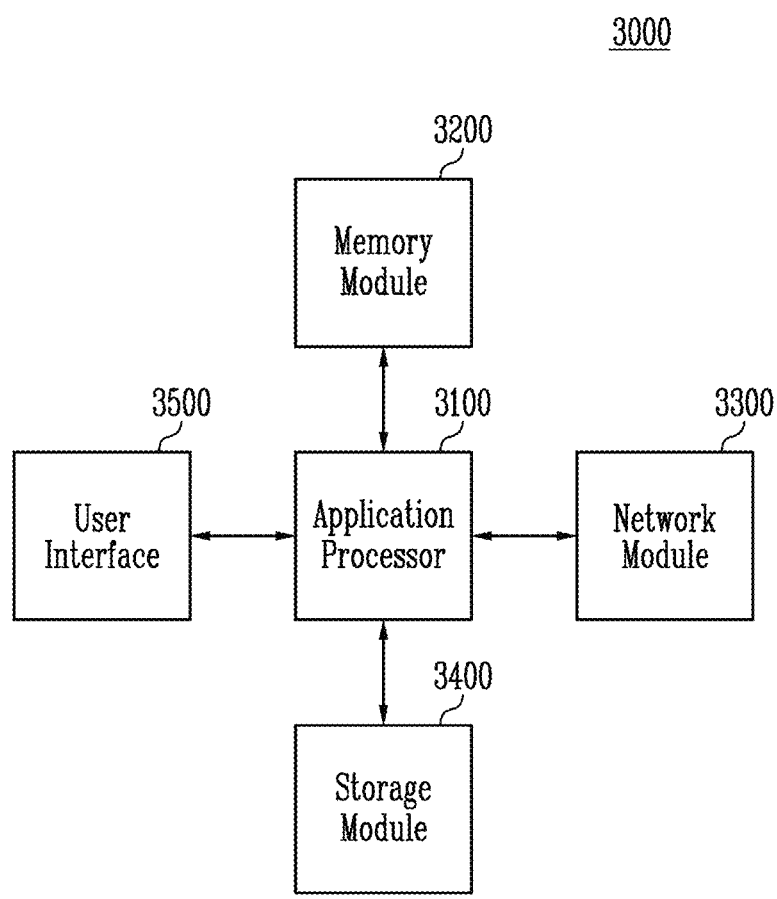
FIG. 19 is a block diagram illustrating a user system to which the storage device is applied in accordance with an embodiment of the disclosed technology.

FIG. 19 is a block diagram illustrating a user system to which the storage device is applied in accordance with an embodiment of the disclosed technology.

Referring to FIG. 19, the user system 3000 includes an application processor 3100, a memory module 3200, a network module 3300, a storage module 3400, and a user interface 3500.

The application processor 3100 may drive components included in the user system 3000, an operating system (OS), a user program, or the like. Exemplarily, the application processor 3100 may include controllers for controlling components included in the user system 3000, interfaces, a graphic engine, and the like. The application processor 3100 may be provided as a System-on-Chip (SoC).

The memory module 3200 may operate as a main memory, working memory, buffer memory or cache memory of the user system 3000. The memory module 3200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 3100 and the memory module 3200 may be provided as one semiconductor package by being packaged based on a Package on Package (PoP).

The network module 3300 may communicate with external devices. Exemplarily, the network module 3300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 3300 may be included in the application processor 3100.

The storage module 3400 may store data. For example, the storage module 3400 may store data received from the application processor 3100. Alternatively, the storage module 3400 may transmit data stored therein to the application processor 3100. Exemplarily, the storage module 3400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 3400 may be provided as a removable drive such as a memory card of the user system 3000 or an external drive.

The user interface 3500 may include interfaces for inputting data or commands to the application processor 3100 or outputting data to an external device. Exemplarily, the user interface 3500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 3500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the disclosed technology, there can be provided a storage device having a reduced power consumption amount and an operating method thereof.

While the disclosed technology has been shown and described with reference to certain exemplary embodiments thereof, it will be understood by those skilled in the art that various changes in form and details may be made therein without departing from the spirit and scope of the disclosed technology as defined by the appended claims and their equivalents. Therefore, the scope of the disclosed technology should not be limited to the above-described exemplary embodiments but should be determined by not only the appended claims but also the equivalents thereof.

In the above-described embodiments, processing or operational steps may be selectively performed or part of the steps and may be omitted. In each embodiment, the steps are not necessarily performed in accordance with the described order and may be rearranged. The embodiments disclosed in this specification and drawings are only examples to facilitate an understanding of the disclosed technology, and the disclosed technology is not limited thereto. Various modifications can be made based on the disclosure of this patent document.

What is claimed is:

1. A method for operating a memory controller for controlling a memory device, the method comprising:
    adjusting a standby entry time based on a reference interval and previous host idle intervals that occur before a current host idle interval, each previous host idle interval defined as an interval between host busy periods and each host busy period defined as an interval between a reception of a corresponding request from a host and a transmission of a response to the corresponding request to the host;
    determining an operation mode based on the adjusted standby entry time and the current host idle interval; and
    controlling the memory device according to the operation mode.

2. The method of claim 1, wherein the adjusting of the standby entry time includes:
decreasing the standby entry time in case that the previous host idle intervals include a number of first host idle intervals that exceed the reference interval; and
increasing the standby entry time in case that the previous host idle intervals include another number of second host idle intervals shorter than or equal to the reference interval.

3. The method of claim 2, wherein the first host idle intervals are successively occurred as a part of the previous host idle intervals, the number of the first host idle intervals is equal to a first reference number, the second host idle intervals are successively occurred as another part of the previous host idle intervals, and the another number of the second host idle intervals is equal to a second reference number.

4. The method of claim 3, wherein the first reference number is greater than or equal to the second reference number.

5. The method of claim 1, wherein the determining of the operation mode includes determining the operation mode as a standby mode in case that the current host idle interval exceeds the adjusted standby entry time.

6. The method of claim 4, wherein each of the host idle intervals includes an internal busy period and an internal idle period, and
wherein the determining of the operation mode includes determining the operation mode as the standby mode in case that an internal idle period included in the current host idle interval exceeds the adjusted standby entry time.

7. A memory controller for controlling a memory device, wherein the memory controller is in communication with a host to receive one or more requests from the host and configured to enter a standby mode in case that a standby entry time has been expired, and the memory controller comprises:
a temperature sensor configured to sense an internal temperature of the memory controller;
an operation mode controller configured to adjust the standby entry time based on the internal temperature, and determine an operation mode based on the adjusted standby entry time and a host idle interval that is defined as an interval between host busy periods; and
an operation controller configured to control the memory device according to the operation mode;
wherein each of the host busy periods is a period between when a corresponding request is received from the host and when a response to the corresponding request is provided to the host.

8. The memory controller of claim 7, wherein the operation mode controller includes:
a standby entry time adjuster configured to decrease the standby entry time in case that the internal temperature increases or increase the standby entry time in case that the internal temperature decreases; and
a standby mode controller configured to determine the operation mode as the standby mode.

9. The memory controller of claim 8, further comprising a storage configured to store a lookup table including standby entry times corresponding to internal temperatures.

10. The memory controller of claim 7, wherein the operation controller controls an output of a power supply management device configured to provide power to the memory controller based on whether the memory controller enters into the standby mode.

11. A memory controller for controlling a memory device, wherein the memory controller is in communication with a host to receive one or more requests from the host and configured to operate in a standby mode based on a condition related to a standby entry time, and the memory controller comprises:
an operation mode controller configured to adjust the standby entry time based on previous host idle intervals that occur before a current host idle interval, each previous host idle interval defined as an interval between host busy periods and each host busy period defined as an interval between a reception of a corresponding request from the host and a transmission of a response to the corresponding request to the host, and further configured to determine an operation mode based on a comparison between the adjusted standby entry time and the current host idle interval; and
an operation controller in communication with the operation mode controller to receive information from the operation mode controller on the operation mode and configured to control the memory device according to the operation mode,
wherein the operation mode controller is further configured to adjust the standby entry time based on a number of first host idle intervals or another number of second host idle intervals, the first host idle intervals successively occurred as a part of the previous host idle intervals and longer than a reference interval and the second host idle intervals successively occurred as another part of the previous host idle intervals and shorter than or equal to the reference interval.

12. The memory controller of claim 11, wherein the operation mode controller includes:
a standby entry time adjuster configured to decrease the standby entry time in case that the number of the first host idle intervals is equal to a first reference number or increase the standby entry time in case that the number of the second host idle intervals is equal to a second reference number; and
a standby mode controller configured to determine the operation mode as a standby mode in case that the current host idle interval exceeds the adjusted standby entry time.

13. The memory controller of claim 12, wherein the first reference number is greater than or equal to the second reference number.

14. The memory controller of claim 12, wherein the standby mode controller is configured to determine the operation mode as an active mode in response to receiving the one or more requests from the host, the receiving occurring in the standby mode.

15. The memory controller of claim 11, wherein each of the previous host idle intervals includes an internal busy period and an internal idle period; and
wherein the operation mode controller is configured to determine the operation mode as the standby mode in case that the internal idle period included in the current host idle interval exceeds the adjusted standby entry time.

16. The memory controller of claim 15, wherein the operation controller is configured to perform a background operation during the internal busy period, and
wherein a power consumption amount during the internal busy period is smaller than that consumed during the host busy period.

17. The memory controller of claim 15, wherein a power consumption amount consumed during the internal idle period is greater than that in the standby mode.

18. The memory controller of claim 11, wherein the reference interval is shorter than the standby entry time, and wherein the operation mode controller is further configured to adjust the reference interval as the standby entry time is adjusted.

19. The memory controller of claim 11, wherein the operation mode controller includes:
- a temperature sensor configured to sense an internal temperature; and
- a performance limiter configured to generate a corrected standby entry time obtained by correcting the standby entry time based on the internal temperature.

20. The memory controller of claim 19, further comprising a storage configured to store a lookup table including standby entry times corresponding to internal temperatures.

* * * * *